United States Patent
Koszo

(10) Patent No.: US 9,187,377 B2
(45) Date of Patent: Nov. 17, 2015

(54) METHOD OF FORMING CERAMIC ARTICLES FROM RECYCLED ALUMINOSILICATES

(75) Inventor: Sandor Koszo, Henan (CN)

(73) Assignee: Vecor IP Holdings Limited, Hong Kong (CN)

( * ) Notice: Subject to any disclaimer, the term of this patent is extended or adjusted under 35 U.S.C. 154(b) by 18 days.

(21) Appl. No.: 14/112,787

(22) PCT Filed: Apr. 20, 2011

(86) PCT No.: PCT/CN2011/073046
§ 371 (c)(1),
(2), (4) Date: Dec. 17, 2013

(87) PCT Pub. No.: WO2012/142752
PCT Pub. Date: Oct. 26, 2012

(65) Prior Publication Data
US 2014/0094358 A1     Apr. 3, 2014

(51) Int. Cl.
*C04B 35/00*     (2006.01)
*C04B 35/653*    (2006.01)
(Continued)

(52) U.S. Cl.
CPC ............ *C04B 35/653* (2013.01); *C04B 33/138* (2013.01); *C04B 33/1324* (2013.01); *C04B 33/1352* (2013.01); *C04B 33/16* (2013.01);
(Continued)

(58) Field of Classification Search
CPC .... C04B 35/111; C04B 35/652; C04B 35/18; C04B 35/14; C04B 35/66; C04B 2235/3418; C04B 33/13
USPC .......................... 501/127, 128, 129, 130, 131
See application file for complete search history.

(56) References Cited

U.S. PATENT DOCUMENTS 4,455,353 A * 6/1984 Bruce ........................... 428/553
4,737,476 A * 4/1988 Hillig ............................. 501/87
(Continued)

FOREIGN PATENT DOCUMENTS

| CN | 1450014 A | 10/2003 |
|----|-----------|---------|
| CN | 101747050 A | 6/2010 |

OTHER PUBLICATIONS

International Search Report for International Application No. PCT/CN2011/073046, mailed on Feb. 9, 2012.

*Primary Examiner* — Noah Wiese
(74) *Attorney, Agent, or Firm* — Knobbe, Martens, Olson & Bear, LLP

(57) ABSTRACT

The present invention relates to a process of forming ceramic articles that contain a high percentage of recycled alumina silicate in their composition. The fabrication process includes a fusing of the base material forming a reticulated network that is in-filled with a melted additive composition. The base material gives the article dimensional stability and strength while the additive composition gives the article water resistance and toughness. In this invention, an additive powder with an engineered melting temperature is added to the recycled base material. The mixture is heated until the recycled aluminosilicate reaches the optimal fusing temperature. Heating is continued until the additive begins to melt filling the voids between the fused aluminosilicates particles. The article is then rapidly cooled to quench the fusing without cracking. The resulting article has high strength due to the fused alumina silicate particles and low water absorbance and high density due to the melted additive component filling all the pores between the fused alumina silicate particles.

19 Claims, 3 Drawing Sheets

Figure 1:
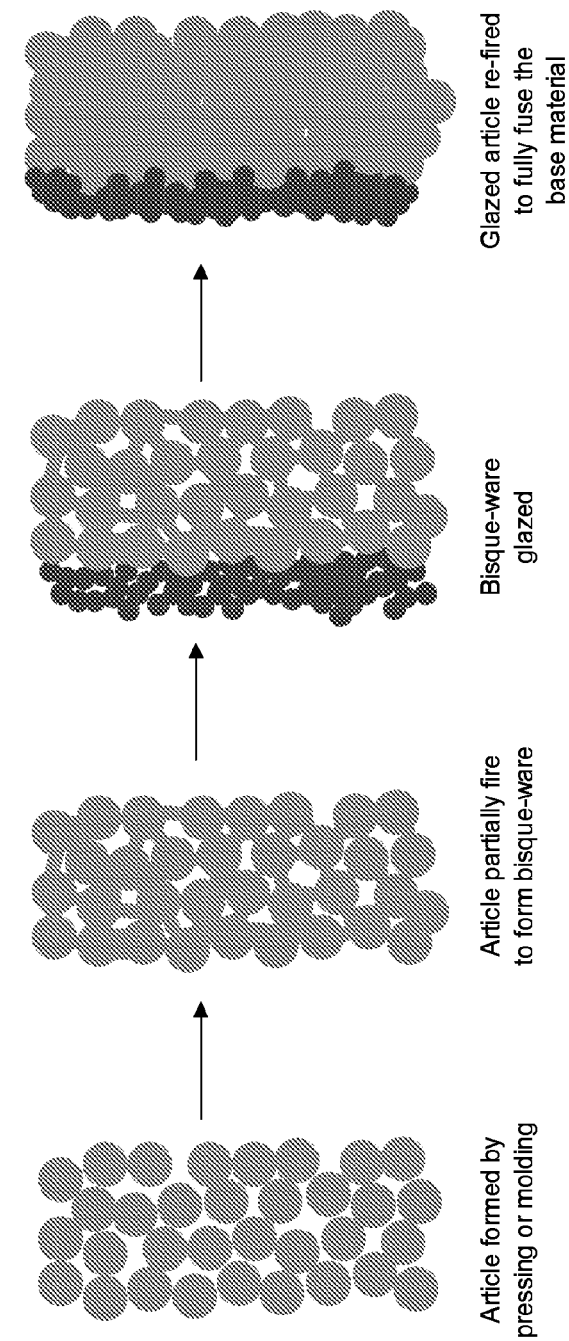

(51) Int. Cl.
- *C04B 33/132* (2006.01)
- *C04B 33/135* (2006.01)
- *C04B 33/138* (2006.01)
- *C04B 33/16* (2006.01)
- *C04B 33/32* (2006.01)
- *C04B 35/626* (2006.01)

(52) U.S. Cl.
CPC ............ C04B 33/323 (2013.01); C04B 35/6263 (2013.01); *C04B 2235/3231* (2013.01); *C04B 2235/6562* (2013.01); *C04B 2235/6565* (2013.01); *C04B 2235/6567* (2013.01); *C04B 2235/96* (2013.01)

(56) References Cited

U.S. PATENT DOCUMENTS

| | | | |
|---|---|---|---|
| 5,096,661 A * | 3/1992 | Lang | 419/2 |
| 5,521,132 A * | 5/1996 | Talmy et al. | 501/155 |
| 6,407,022 B1 * | 6/2002 | Sandhage et al. | 501/80 |

* cited by examiner

METHOD OF FORMING CERAMIC ARTICLES FROM RECYCLED ALUMINOSILICATES

CROSS-REFERENCE TO RELATED APPLICATIONS

This application is the U.S. National Phase under 35 U.S.C. §371 of International Application PCT/CN2011/073046, filed Apr. 20, 2011.

FIELD OF THE INVENTION

This application concerns a method for the formation of aluminosilicate articles and particularly the formation of ceramic articles which include a high percentage of recycled aluminosilicates in the article.

BACKGROUND OF THE INVENTION

Coal combustion ash (CCA) is a by-product derived from the combustion of coal and comprises finely divided inorganic products. Enormous amounts of CCA are produced annually worldwide, primarily from burning coal in electric power plants. Disposal of CCA has posed an increasing difficult problem because the volume increases annually, because of the light and dusty nature of the material, and because the varied chemical composition of CCA limits the number of acceptable disposal methods and sites.

Efforts have been made to find alternative economic uses for CCA. For example, CCA has been used as an additive in Portland cement. However, the fraction of CCA which is suitable for use in concrete represents a small portion of the total amount of ash available. Another use for CCA waste is as fill in asphalt and land reclamation. These uses have low economic value and the risk of heavy metals leeching out of the CCA is a concern. The world needs more economically advantageous uses for CCA to reduce the burden and recoup value. One promising use is as a raw material for ceramic articles.

Traditional Ceramics Formulations and Formation Methods

Ceramic articles are typically made by forming wet clay into desired shapes followed by active drying. Sometimes these shapes are formed by hand, but more commonly they are pressed into shape by machine. This is particularly true of ceramic tiles and other stoneware. The dried article has sufficient dimensional stability and strength to withstand handling. The article is then fired in a kiln to 1250-1350 degrees C. to fuse the clay particles together. The material is sufficiently heated to cause the clay particles to melt and fuse into a glassy mass. This process is called vitrification and the material must be cooled slowly to avoid cracking. The liquefaction of the material ensures that the pores between particles have all disappeared and the water absorbance is low, but this requires high temperatures and therefore has high energy costs.

Alternative Ceramics Formulations and Methods

Bisque Sintering

A related method for forming ceramic articles is called bisque firing. In this process, a shaped article is dried to gain strength, and then the dry article is heated to roughly half of its melting temperature. Compacted powders will begin to fuse when heated to about half of their absolute melting temperature. This produces "bisque-ware" and a common trait of these articles is that the surface area of the article decreases (the article shrinks) while the strength of the fired article increases. In bisque-ware, clay particles partially fuse without completely vitrifying. The article is firm and will no longer soften in water, but is very porous and not as strong as it will be after final firing. The material can be handled carefully at this stage, however, after firing the material must be cooled slowly to avoid cracking.

Glaze material is then applied to the surface of the article and is fired again at higher temperatures. The glaze melts and adheres to the surface of the article and the body composition of the article resumes sintering to a point where the material is almost completely vitrified and forms a solid ceramic material. The glaze coating not only adds decoration but also seals the article to achieve very low water absorbance. FIG. 1 schematically shows the method for forming conventional bisque-ware. The process entails forming a partially fused material with many pores, applying a glaze to the article, and re-firing to seal the bulk material.

Liquid Phase Sintering

Figure 2:
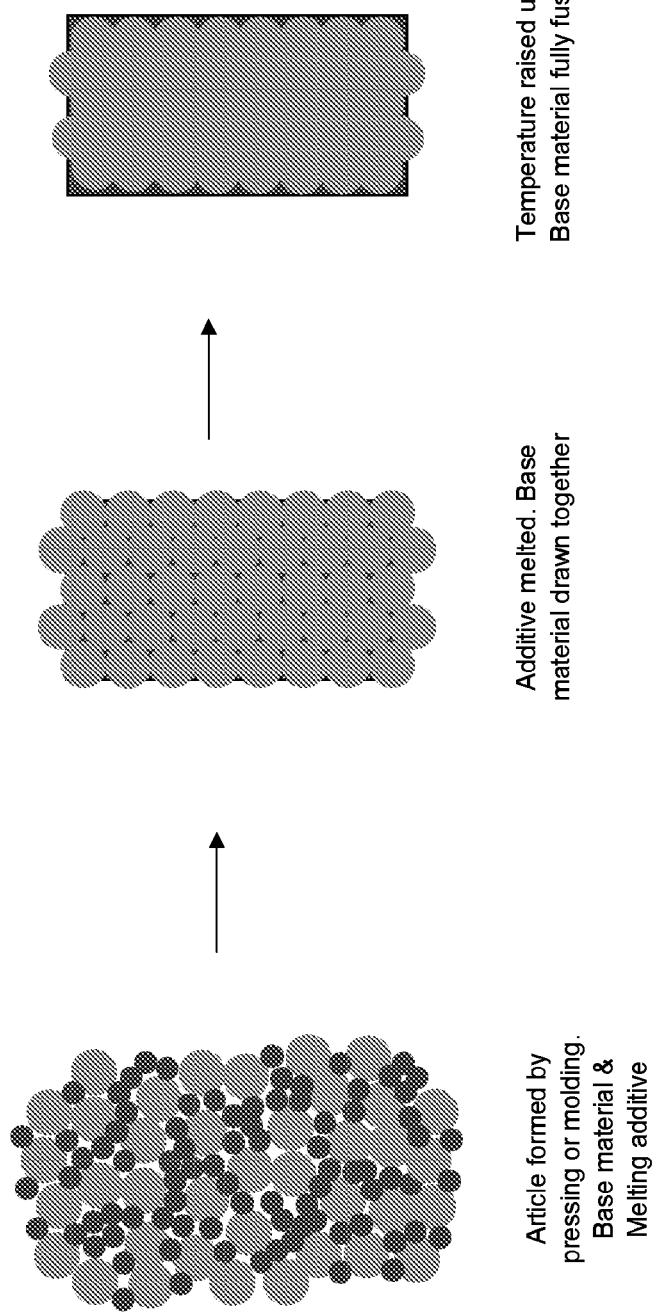

Another related method to the traditional methods of making clay articles is to perform liquid phase sintering where a low-melting material (the additive) is introduced into the clay mixture. This material melts at a temperature below the sintering temperature of the clay particles (base particles). The melted liquid phase pulls together the clay particles through capillary action into a close-packed arrangement that minimizes the space between the solid particles. This process is driven by the thermodynamics of the system to reduce the wetted area of the liquid. As the temperature continues to rise, the close-packed clay particles melt together expelling the low-melting (now liquid) material. For the details, see "Liquid Phase Sintering", Randall M. German, Plenum Press, 1985. This process requires high temperatures and there is a risk of product deformation (slumping) when the second composition melts and the article loses dimensional stability during heating. Often, molds are used to preserve the shape of an article. Also, the material must be cooled slowly to avoid cracking. FIG. 2 schematically shows the method of conventional liquid phase sintering. As can be seen, first the melt phase forms a liquid and draws the clay particles together. Then, the clay particles melt to form a fused block of material whereupon significant shrinkage occurs.

The traditional liquid phase sintering of clay involves selecting a clay/additive combination where the additive has a high solubility for the clay material, but the clay material has a low solubility for the additive. In this way, the melted additive is semi-permanent liquid during the process; it is not absorbed into the clay base material. As the temperature is raised and the additive melts, it does not soak into, or dissolve into the clay, but instead draws the clay particles together through capillary forces that serve to reduce the volume of the liquefied additive. The temperature is raised until the clay particles begin to fuse. Since the clay particles are close together due to the capillary action of the melted additive, they fuse slightly (forming a "neck" between particles) and then eventually they fuse together completely forcing out the liquefied additive from between them. Any voids that remain are filled with the melted additive.

Limitations of the liquid phase sintering are that the article can slump when the melting additive begins to melt. This is because there is no structural framework throughout the clay material to support the article between the time the additive melts and the time the clay material begins to fuse. Additionally, the fusing temperature range is narrow and can be easily exceeded. When this happens the material does not fuse together but instead completely melts and all shape is lost as the material liquefies. Another problem is that the lower temperature melt additive material can run out of the bulk material if the article is not constrained in a mold.

Tile Formation

One type of article that can be produced using these methods is ceramic tiles for floors or walls. They are usually decorated or undecorated flat panels that fit together to form a pattern on a wall or floor. Traditional methods of tile formation involve mixing clay and other minerals together to form dough which can be formed into shapes by pressing or forming in other ways, and then fired. Usually the ingredients are mixed in a ball mill with a fixed amount of water. The average particle size is reduced in ball mills and causes all the ingredients to be intimately mixed. The mixture leaves the ball mill as a slurry which is spray-dried to remove the water and to produce a granular material that is used in further processing. The granular material forms a free-flowing powder that is easy to transport and fills the molds used in ceramic tile die cavities.

Ceramic tile dies are filled with this granular mixture and then hydraulic presses form tiles in the cavities. The tiles are dried and glaze is applied for decoration and to seal the tile (providing low water absorbance). The glazed surface also makes the tile hard and provides a durable surface that resists wear. The decorated tile typically then goes into a tunnel kiln where it is fried to sinter the tile and melt the glaze into the surface layer. During the firing the clay and other ingredients fuse together to form a solid ceramic material.

Some methods for forming ceramic articles use coal ash or CCA or other waste as raw materials, for example, in GB1058615, U.S. Pat. No. 3,679,441, U.S. Pat. No. 5,521,132, U.S. Pat. No. 6,743,383, U.S. Pat. No. 5,935,885, U.S. Pat. No. 6,566,290, AU708171, WO03059820, as well as CN1260336, CN1410386, CN1029308, CN101372414, CN1070177, etc.

U.S. Pat. No. 5,935,885 discloses ceramic tiles made from CCA and other incinerator wastes but the methods used involve oxidation of the mixture components at a temperature of 1000 to 1500 C and high temperature vitrification (1250 to 1550° C.) to completely melt all the aluminosilicates with the goal of locking in heavy metal contaminates.

U.S. Pat. No. 6,743,383 discloses using industrial wastes, including CCA, to make ceramic tiles, but only use low percentages of wastes.

U.S. Pat. No. 5,521,132 disclose a ceramic materials made from coal fly and municipal solid waste CCA and processes for producing the ceramic materials, in which over 85% weight percent of CCA is included in the ceramic material and is bonded together by water-insoluble reaction products produced by the reactions between the components of a molten flux and portions of the residue CCA particles which may have dissolved into the molten flux. This process uses sodium tetraborate as an additive and includes the step of firing at a temperature of from just above the melting point of sodium tetraborate to about 1000 degree C.

The above processes suffer from several disadvantages: the waste material especially the CCA needs to be melted at a higher temperature thereby significantly increasing energy consumption; the cooling of ceramic article lasts for a long time, leading to the consumption of more energy; and some of them require the use of a mold. Therefore, it is desirable to provide an improved process for forming aluminosilicate articles such as ceramic articles that uses less energy, lowers the cost and provides the ceramic article having improved properties such as higher strength and lower water absorption.

SUMMARY OF THE INVENTION

The present invention is directed to a method of forming articles, such as ceramic articles, using aluminosilicates, such as recycled aluminosilicates. This method is significantly different from traditional methods of forming ceramic articles such as liquid phase sintering or bisque-ware. The method uses a two-component system in which the bulk phase or base material refers to a major component comprising about 70% to about 90%, such as about 80%, by weight of the article, which undergoes partial fusing, and a minor phase or additive material comprising about 10% to about 30%, such as about 20% by weight of the article, which undergoes melting.

Instead of melting an additive first and drawing the base material particles together followed by fusing the particles (as in traditional liquid phase sintering), or partially fusing the material, cooling, and later apply a surface coating of glaze and re-firing (as in traditional bisque-ware), the inventive method partially sinters or fuses the base material first, with a higher melt temperature additive included in the body composition. Once fusing of the base material reaches the optimal level, for example, the fused base material is fused to about 50% to about 85%, preferably about 60% to about 70% of total possible fusion of the base material, the additive melts at its engineered melting temperature and seals the internal voids formed by the fusing step. The whole article is then quickly cooled which locks-in the glassy nature of the material and ensures high toughness and low porosity.

The optimal fusing point is where the particles are substantially fused together so that they form a strong structure after firing, yet at temperatures low enough that the material does not lose structural integrity. For the present invention, it is important to determine the optimal fusing temperature (OFT) of each base material, such as recycled aluminosilicates. As the fusing temperature increases, the structure strength of the final, cooled article increases, while the article starts to shrink and the possibility of slump increases. To achieve final article with the strongest structural strength and the least dimensional change, an intermediate fusing temperature, which is lower than the experimentally determined temperature at which the article slumps, but high enough to create the optimal structural strength in the final, cooled article, should be determined firstly. As used herein, the term "dimensional change" means both slumping during firing and shrinkage in the final article. The inventive method avoids slumping temperatures and lessens the amount of shrinkage in the final article.

As indicated here, at the optimal fusing temperature of the present invention, the base materials of the article partially fuse, for example, preferably at about 60% to about 70% of total possible fusion. Then the additive melts at a temperature above the optimal fusing temperature (this higher temperature is called the second temperature). Then the article is cooled rapidly to the ambient temperature without risk of cracking. The resulting article has the optimal properties, such as the maximum structural strength, the least amount of dimensional change, and low water absorbance. The second temperature of the additive is engineered to melt preferably at about 5 to about 10 degrees above the temperature of optimal fusing. In this case the second temperature may be around the intermediate fusing temperature, as indicated above.

The present invention provides a process for forming an aluminosilicate article such as ceramic article comprising the (recycled) aluminosilicate base material and an additive material, the process comprises the steps of: optimally fusing the aluminosilicate base material at a first temperature (optimal fusing temperature), for example about 1200° C. to about 1235° C., preferably from about 1210° C. to about 1220° C., such as about 1215° C., experimentally determined for a sample of the (recycled) aluminosilicate, melting an additive material at a second temperature (melting temperature) higher than the first temperature, for example about 1210° C. to about 1255° C., preferably from about 1215° C. to about 1230° C. to fill in the pores of the base material body, and rapidly cooling the article to lock the amorphous structure.

In an embodiment, the second temperature is higher than the first temperature by about 5° C. to about 20° C., preferably by about 10° C. to about 15° C. and preferably from 5° C. to about 10° C.

In an embodiment, the article is cooled at ambient conditions.

In a further embodiment, the article is rapidly cooled to ambient temperature over about 4 minutes to about 15 minutes, preferably from 5 minutes to 10 minutes.

In an embodiment, the resulting article has a much lower water absorbance than the one produced by the traditional methods such as bisque ware.

In a further embodiment, the resulting article has an increased structural strength.

In an embodiment, the article is rapidly fired to maximum temperature over about 12 minutes to about 30 minutes, preferably from 15 minutes to 20 minutes.

In another embodiment, the aluminosilicate comprises a recycled aluminosilicate.

In another embodiment, the recycled aluminosilicate comprises a coal combustion ash.

In another embodiment, the first temperature is an optimal fusing temperature of the aluminosilicate base material.

In another embodiment, the second temperature is the melting temperature of the additive material.

In another embodiment, the additive material comprises: natural aluminosilicates, quartz, dolomite, kaolin, alumina, bentonite, bauxite, feldspar, or mixtures thereof.

In another embodiment, the additive material comprises minerals which melt at intermediate temperatures. Here, the intermediate temperatures refer to the temperatures between the higher melting temperature and the lower melting temperature of the additive materials.

Still in another embodiment, the aluminosilicate article comprises the aluminosilicate base material of about 70% to about 90% by weight, such as about 80% by weight, and the additive material of about 10% to about 30% by weight, such as about 20% by weight, based on the total weight of the two-component mixture.

BRIEF DESCRIPTIONS OF DRAWINGS

FIG. 1 schematically shows a process of conventional bisque-ware.

FIG. 2 schematically shows a process of conventional liquid phase sintering.

Figure 3:
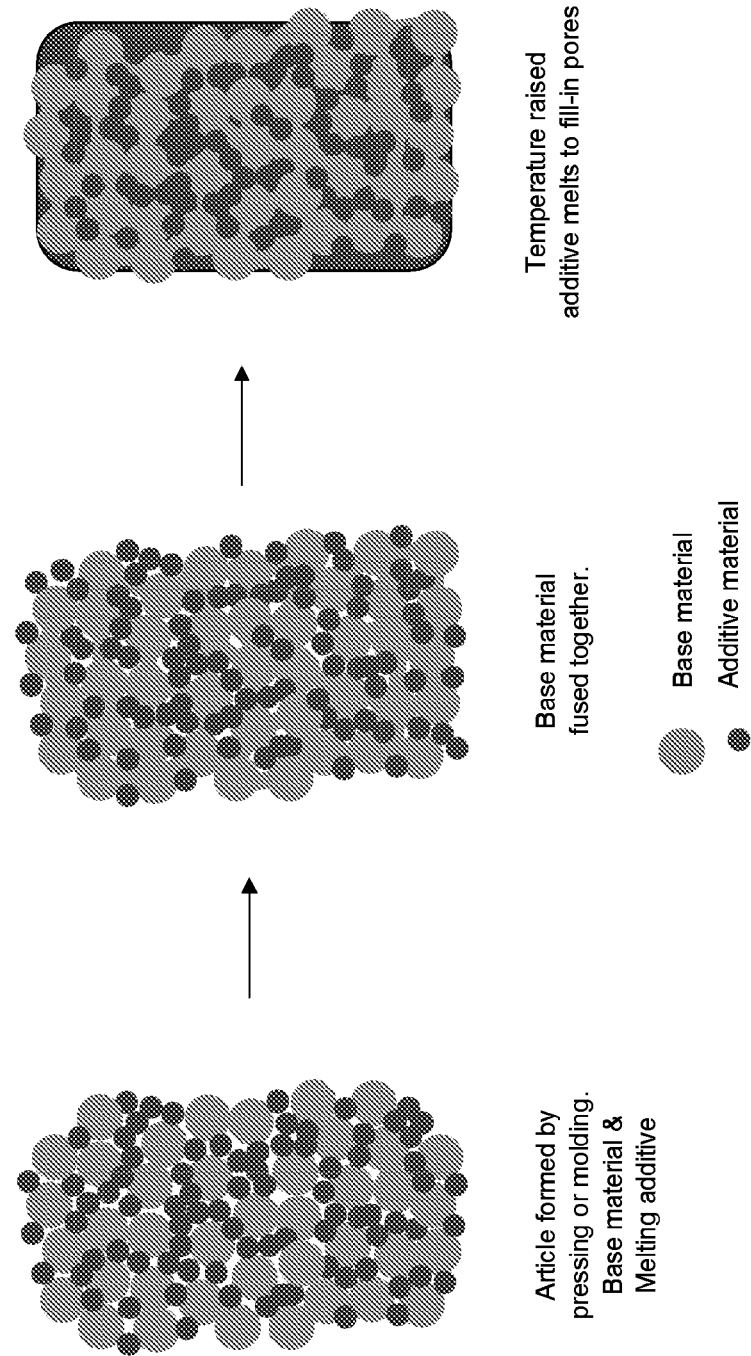

FIG. 3 schematically shows a process in accordance with the present invention.

DETAILED DESCRIPTION OF THE INVENTION

The present invention provides a process for producing an aluminosilicate article such as a ceramic article from aluminosilicates such as natural aluminosilicates or recycled aluminosilicates and an additive material. For the purpose of this invention, the recycled aluminosilicates (RAS) are preferred and refer to the waste material from coal combustion including fly ash, bottom ash, slag, and other combustion wastes. These will be referred to as coal combustion ash (CCA). Additionally RAS can include wastes from the cutting, grinding, or polishing of ceramic materials. These materials are often referred to as "grog" in the industry. The present invention can use CCA directly from power plants or heating plants, or grog directly from the ceramics factories, as the RAS.

It is critical for the method of the present invention that the additive material which is a melt additive (MA) composition is selected and adjusted so that its melting point is just above the temperature where the RAS reach an optimal fusing temperature (OFT). Each RAS has a different temperature at which it reaches optimal fusing, and so the MA will require an engineered formulation to match the OFT of the RAS.

This is a significant difference from traditional methods. In the traditional method such as regular liquid phase sintering, the melting temperature of the melt additive does not have to be specifically engineered to each base material used, but it only needs to be below the sintering temperature of the base material. As an example, if the base materials sinter at a high temperature, for example above about 1250° C., then the melting additive only needs to be fully liquid at a temperature below about 1250° C., so the additive melts first, followed by the full fusion of the base material. As those skilled in the art recognize, when the fusing temperature reaches a sufficiently high temperature, such as about 1270° C., which can be called a upper limit for melting, all the base material in the article will fully fuse, (i.e. melt) this will cause the article to have an increased structural strength, a shrinkage of about 8% to 10%, and this will also result in cracking if the cooling is rapid. In contrast, in the inventive method, when the RAS reaches an optimal fusing temperature such as about 10° C. to about 20° C. below the temperature when the material begins to slump, only a portion of the possible fusion occurs; for example, about 60% to about 70% of total possible fusion occurs. When an included additive melts at an engineered melting temperature of about 5° C. to 20° C. preferably about 10° C. to about 15° C. or from 5° C. to about 10° C. above the OFT of the RAS, it seals the internal voids formed by the optimally fused base material. In optimally fused material, the shrink is only about 4% to about 8% and no slump occurs. The balance point is achieved at a temperature at which the article is formed with the maximum structural strength, yet the least amount of dimensional change, and it can be cooled rapidly with no cracking.

To determine the OFT of a sample of RAS, the sample is prepared by sizing it to less than about 200 mesh, then putting 25 g of the sample in a dish and heating it to a sufficiently high temperature to melt completely (for example about 1270° C.). The temperature is progressively lowered stepwise (for example about 5° C. to about 20° C. at a time) in subsequent tests with fresh material until the material fuses into a structurally strong mass, with minimal (for example about 4% to about 8%) shrinkage. The temperature when this happens is the OFT.

The melt additive (MA) is typically comprised of naturally-occurring aluminosilicates (NAS) possessing substantial rheological properties with various other ingredients included to modify the MA's melting temperature. It is known in the industry that "substantial rheological properties" mean an Atterberg's plasticity index above 25. In this case, the melting points of such NAS vary substantially so the MA's melting temperature needs to be adjusted to match the optimal fusing temperature of the RAS. To accomplish this, a suitable range of mineral additives are added to the NAS to lower or raise its melting temperature. Such mineral additives can include quartz, dolomite, kaolin, alumina, bentonite, bauxite, feldspar, or mixtures thereof. Normally about 2% to about 10% by weight (based on the total weight of the additive material mixture) of the mineral additives is added to the NAS as needed. For example, feldspar can be added to lower the melting temperature of the MA while quartz or alumina can be added to raise the melting temperature of the MA. Adjusting the ratio of mineral additives added to the NAS allows the MA's melting point to be engineered to be slightly above the OFT of the RAS.

Description of the Firing Curve

The firing of the RAS and MA mixture proceeds at steadily increasing temperatures.

Preferably, the different stages can be as follows:

Stage 1: Temp #1 (about 750° C., reached in about 5 min)

Stage 2: Temp #2 (about 1200° C. to about 1235° C., reached in about 12 minutes to about 30 minutes from the start)

Stage 3: Temp #3 (about 5° C. to about 20° C. above Temp #2, reached in about 0.5 minute to about 1 minute after Temp #2 and held from about 2 minutes to about 5 minutes)

Stage 4: Temp #4 (about 20° C. to about 25° C. (i.e. ambient temperature), reached as quickly as possible)

At stage 1, at Temp #1, any remaining combustible impurities in the RAS are burned out, and the volatiles escape. This reduces the chance that a black core will form due to reduced residual metals in the RAS. At stage 2, Temp #2 is the OFT which is reached in about 12 minutes to about 30 minutes total while the RAS particles fuse to an optimal amount, for example from about 50% to about 85% of total possible fusing, preferably from about 60% to about 70% of total possible fusing. Optimal fusing is the amount of fusing between aluminosilicate particles that achieves the maximum structural strength in the final article with the least amount of dimensional change. This is determined experimentally for each material. At stage 3, the melting temperature of the MA is reached and is held for about 2 minutes to about 5 minutes to cause the MA to melt and fill the voids in the optimally fused RAS. Finally at stage 4, the article is rapidly cooled to ambient temperatures (about 20° C. to about 25° C., for example 22° C.). The rate of cooling is limited by the firing equipment, in some instances, the article can be rapidly cooled to ambient temperature over about 4 minutes to about 15 minutes, preferably from 5 minutes to 10 minutes.

FIG. 3 schematically shows a process in accordance with the present invention. A mixture of RAS and MA is pressed together into a green article which can be handled and transferred to a kiln for firing. As can be seen in FIG. 3, the RAS particles fuse together to secure the formed shape, and then the MA melts to fill the inter-particle spaces. The article is then cooled rapidly to stop the fusing and melting and lock the amorphous structure. The MA melted throughout the article provides the article reduced porosity and increased water resistance.

No compression or mold during fusing is required in this process as in traditional liquid phase sintering because the article is not heated enough to slump. The article retains its original size and shape because the OFT is low enough that there is no loss in the structural integrity of the green article during firing. At the OFT, a reticulated structure throughout the RAS preserves the shape and volume of the article. Additionally, the melting point of the MA is reached at a temperature slightly above the optimal fusing temperature of the RAS, so there is little additional dimensional or structural change while the MA melts and fills in the pores of the reticulated structure.

The whole article can be rapidly cooled after sufficient thermal flux has been achieved to cause the MA to fill all the pores in the reticulated RAS. The rapid cooling is possible because with RAS materials there is no change in crystal structure during cooling as in traditional ceramic materials. In traditional ceramic firing, this crystalline phase change can stress the article and cracks can form if the cooling is not done slowly enough. The RAS does not undergo such transitions and so stress cracks do not develop.

Determining the optimal fuse point of each sample of RAS is necessary, as is adjusting the melting point of the MA to match a particular sample of RAS. The MA must be melted throughout the reticulated RAS material to achieve near zero water absorbance in the final article. If the melting point of the MA is too high, then the article can warp and slump. If the set melting point of the MA is too low, then it will liquefy before optimal fusing of the RAS is finished. And there is the risk that it will flow out of the body composition and/or begin to bubble. Either of these events would cause voids in the article body, lowering strength and increasing water absorbance.

As used herein, terms "optimal fusing", "optimally fusing", "partially fusing", "partially fuses" and "partial fusing" may be used interchangeably, which refers to about 50% to about 85%, preferably about 60% to about 70% of total possible fusing of the base material, such as recycled aluminosilicates. This usually happens over a temperature range of, for example, about 5 to about 10° C. above the OFT.

As used herein, the term "fully fused" means melt, i.e. 100% fused, and the term "100% fusing" means the state where all the particles are complete homogeneous with each other and there are no special voids, the term "%fusing" means the percent of total possible fusing of the base material.

As used herein, the term "green pressed article" refers to the pressed but un-sintered powder compact. The green porosity refers to the void space prior to sintering. Green density is lower than liquid sintered density. Because densification is dimensionless it is often just expressed as a percentage of possible densification. A densification of 100% corresponds to a compact that has reached is theoretical density of the base material. The final density of products made in this process does not reach this theoretical density because the base material is not fully sintered or melted.

In Stage 1, the RAS undergoes a preheat process to eliminate combustible impurities in the material. In this way, any carbonaceous material in a sample of RAS can reduced to a value of less than about 2%. Alternatively, carbon in a sample of RAS may be reduced to less than about 2% by any known separating technique, or combination of techniques such as gravity separation, electrostatic separation and froth flotation, etc.

A benefit of melting the MA secondarily to the fusing of the RAS is that volatilized carbon wastes within the RAS have a passage out of the material. In traditional liquid sintering the MA melts first and closes all the paths that oxidize carbon waste can escape as $CO_2$. The trapped $CO_2$ can cause bubbles in the article or even cause it to crack or burst.

In this process it is desired to keep shrinkage to a minimum to preserve dimensional integrity of the design. Shrinkage refers to decreases in linear dimensions and the sintered density relates to the green density through the linear shrinkage. Measurements of density and shrinkage give insight into the rate of microscopic changes in the article.

Comparison of Methods

Comparing with the prior arts, the method provided in the present invention has the advantages of low energy consumption, low water absorbance, high strength and short cooling time etc. The comparison of three methods is summarized in Table 1.

TABLE 1

Comparison of 3 ceramic article fabrication methods

| Items | Bisque-ware | Liquid phase sintering | Invention Process |
|---|---|---|---|
| heat energy required | medium | high | low |
| water absorbance | medium | low | low |
| strength | weak | strong | strong |
| molding required | no | yes | no |
| cooling time | slow | slow | quick |

As shown in Table 1, three fabrication methods and their characteristics are described. The first characteristic is the amount of heat energy required in the method. Bisque-ware and the inventive method both require lower amounts of heat because the article is only partially fused. However in bisque-ware formation the energy requirement is higher since the article is cooled to room temperature for decoration before being re-heated to melt the glaze coating. Liquid phase sintering has the highest temperature requirement because the material is fully sintered in the process. The process of the present invention has low energy since the base material is only partially fused and there is no cooling/re-heating required.

The second characteristic is the water absorbance of the final article. In all cases the final water absorbance of the outer surface is low. However in bisque-ware the center of the article is still quite porous so if there is any disruption of the glaze coating due to pinholes, wear, or cracks, the article will absorb water. In certain situations (such as outdoor tile) this can cause premature failure in different environmental conditions. In liquid sintered materials and those made with the present inventive process, the water absorbance is low throughout the material so there is less dependence on a unblemished surface layer. These articles also tolerate wear better.

The third characteristic is the strength of the final article. The bisque-ware and the present inventive process have partially fused networks of base material, but the present inventive process adds strength to that network by interpenetrating it with the additive material which melts and fills in all the weak pores. The bisque-ware only has this added strength in the very outer layer where the glaze is located. The liquid sintered materials are strong due to the fact that they are fully sintered throughout the body of the material.

The fourth characteristic is if molding is required to finish the article or not. No mold is needed for bisque-ware and for the present inventive process since the base material never fully melts (it only partially fuses) and so has little chance to lose dimensional strength during fabrication. In liquid phase sintering, as mentioned above, there is a risk that the article will slump and lose dimensional stability because the base material is fully fused and so is nearly fully melted during the process. Often in liquid sintered articles support structures are needed to limit the risk of slumping.

The fifth characteristic is the cooling time. For liquid phase sintering and bisque-ware fabrication, the cooling rate must be controlled to avoid cracking of the article and particularly to prevent cracking of the glaze in bisque-ware. Cracks in the glaze can lead to problems with water absorbance as described above. Liquid sintered articles run the risk of cracking as they cool because the material was heated to melting and the base material begins to crystallize as it cools. If the cooling rate is increased then the article can crack at these crystal faces. With the present inventive process, the cooling rate can be increased significantly which saves energy. There is no need to limit the cooling rate with additions of heat that slow the cooling. Articles in the present inventive process can be cooled quickly because the recycled material is already a non-crystalline glass and it does not go through a sensitive crystalline phase as it cools.

EXAMPLES

Example 1

Preparation of Ceramic Articles from Recycled Aluminosilicate (RAS) Derived from Coal Combustion Ash Sourced in China Firstly, the selected RAS is sieved through a screen of at least about 200 mesh (about 75 microns). A small sample is placed in a refractory dish and heated to about 1260° C. to about 1270° C. for about 5 minutes. Then after cooling it is checked for having melted. Based on the amount of melting observed, the set temperature is lowered from about 5° C. to about 20° C. and a new sample is tested. This is repeated until the optimal fusing temperature (OFT) is determined. The optimal fusing temperature is described above.

Based on this OFT, the melting additive (MA) is formulated. One component of the additive mix preferably is natural aluminosilicates (NAS) with substantial rheological properties. It is known in the industry that "substantial rheological properties" mean an Atterberg's plasticity index above 25. Different NAS have different melting temperatures and the one chosen preferably melt from about 5° C. to about 10° C. above the OFT. This temperature can be adjusted by mixing with other components that affect the MA melting point. Some of the components lower the melting temperature such as sodium feldspar, and some of them raise the melting temperature such as alumina.

The RAS and the MA are blended and about 8% to about 10% by weight of water is added to increase green strength in the pressed article. The mixture is pressed from about 250 $kg/cm^2$ to about 500 $kg/cm^2$ pressure, and transferred to a kiln to be fired. The temperature is raised according to a custom-designed firing curve, reaching the top temperature in about 12 minutes to about 30 minutes to a temperature that is just below the predetermined OFT and then it is raised through the OFT temperature over about 0.5 minute to about 1 minute up to the MA melting temperature. It is held at that temperature for about 2 minutes to about 5 minutes, preferably about 3 minutes, and then rapidly cooled to ambient temperature over about 4 minutes to about 10 minutes. As mentioned, there is no crystalline transition zone below the firing temperature, and the glassy matrix of the additive adds a thermal stress buffer throughout the material, so the article can be rapidly cooled (limited by the equipment's allowed cooling rate, for example, in the case of this example, it can be cooled to ambient temperature over about 4 minutes to about 15 minutes).

TABLE 2

Tile data from a tile that has a body composition that comprises 80% RAS by weight, 17% NAS by weight, 3% bentonite by weight, and an additional 10% water by weight.

| Test Parameters | High Quality Porcelain Tiles | Inventive Tiles |
|---|---|---|
| Water Absorbance | 0.1% | <0.025% |
| Modulus of Rupture $N/mm^2$ | 65 | >68 |
| Abrasion resistance $mm^3$ | 147 | <75 |

In Table 2, as those skilled in the art know, the term "abrasion resistance" means the amount ($mm^3$) of the scraped area on the test article after abrasion, the less the abrasion resistance is, the better is the resistance of the test article to abrasion. As can be seen from Table 2, the inventive tiles have advantages over traditional products such as High Quality Porcelain Tiles: much less water absorbance, higher modulus of rupture, and much less abrasion resistance.

What is claimed is:

1. A process for forming an aluminosilicate article comprising an aluminosilicate base material and an additive material, the process comprising the steps of:

optimally fusing the aluminosilicate base material at a first temperature to 50% to 85% of total fusing of the aluminosilicate base material, wherein the first temperature is an optimal fusing temperature (OFT), which is a temperature determined by: i) preparing a sample of the aliminosilicate base material by sizing to less than a 200 mesh; ii) placing 25 grams of the sample in a dish; iii) heating the sample to a high temperature to melt completely; iv) lowering the temperature stepwise in subsequent tests with fresh aluminosilicate base material until the material fuses into a structurally strong mass, with minimal shrinkage, wherein the temperature that generates the structurally strong mass is the optimal fusing temperature;

melting the additive material at a second temperature higher than the first temperature; and cooling the article.

2. The process of claim 1, wherein the second temperature is higher than the first temperature by 5° C. to 20° C.

3. The process of claim 1, wherein the article is cooled at 20° C. to 25° C.

4. The process of claim 1, wherein the article is cooled to ambient temperature over 4 minutes to 15 minutes.

5. The process of claim 1, wherein the optimally fusing comprises 60% to 70%, of total possible fusing of the base material.

6. The process of claim 1, wherein the article is fired to the first temperature over 12 minutes to 30 minutes.

7. The process of claim 1, wherein the aluminosilicate comprises a recycled aluminosilicate.

8. The process of claim 7, wherein the recycled aluminosilicate comprises coal combustion waste.

9. The process of claim 1, wherein the second temperature is a melting temperature of the additive material.

10. The process of claim 1, wherein the additive material comprises natural aluminosilicates, quartz, dolomite, kaolin, alumina, bauxite, bentonite, feldspar, or mixtures thereof.

11. The process of claim 1, wherein the aluminosilicate article comprises the aluminosilicate base material from 70% to 90% by weight and the additive material from 10% to 30% by weight, based on the total weight of the aluminosilicate article.

12. The process of claim 1, wherein the first temperature is about 1200° C. to 1235° C., and the second temperature is 1210° C. to 1255° C.

13. An aluminosilicate article that is produced by the process of claim wherein the aluminosilicate article has a water absorbance of less than 0.025%.

14. The process of claim 2, wherein the second temperature is higher than the first temperature by 10° C. to 15° C.

15. The process of claim 2, wherein the second temperature is higher than the first temperature by 5° C. to 10° C.

16. The process of claim 4, wherein the article is cooled to ambient temperature over 5 minutes to 10 minutes.

17. The process of claim 6, wherein the article is fired to the first temperature over 15 minutes to 20 minutes.

18. The process of claim 12, wherein the first temperature is 1210° C. to 1220° C.

19. The process of claim 12, wherein the second temperature is 1215° C. to 1230° C.

* * * * *